(12) United States Patent
Grüne et al.

(10) Patent No.: US 12,434,806 B2
(45) Date of Patent: Oct. 7, 2025

(54) AIRCRAFT PART THAT COMPRISES AN ACCESS DOOR AND A FUSELAGE PART FORMING A CAVITY AND IS CONFIGURED TO REDUCE NOISE GENERATED BY THE CAVITY

(71) Applicants: Airbus Operations (S.A.S.), Toulouse (FR); Airbus Operations GmbH, Hamburg (DE)

(72) Inventors: Jan Sebastian Grüne, Hamburg (DE); Thomas Node-Langlois, Toulouse (FR); Stéphane Galdeano, Toulouse (FR); Jean-Paul Romeo, Toulouse (FR); Grégoire Pont, Toulouse (FR); François Chavet, Toulouse (FR)

(73) Assignees: Airbus Operations (S.A.S.), Toulouse (FR); Airbus Operations GmbH, Hamburg (DE)

( * ) Notice: Subject to any disclaimer, the term of this patent is extended or adjusted under 35 U.S.C. 154(b) by 0 days.

(21) Appl. No.: 18/629,227

(22) Filed: Apr. 8, 2024

(65) Prior Publication Data
US 2024/0343378 A1  Oct. 17, 2024

(30) Foreign Application Priority Data
Apr. 12, 2023  (FR) ..................................... 2303614

(51) Int. Cl.
*B64C 1/14*  (2006.01)
(52) U.S. Cl.
CPC ........ *B64C 1/1461* (2013.01); *B64C 2220/00* (2013.01)

(58) Field of Classification Search
CPC ... B64C 1/1404; B64C 1/1415; B64C 1/1423; B64C 1/143; B64C 1/1438; B64C 1/1446; B64C 1/1461
See application file for complete search history.

(56) References Cited

U.S. PATENT DOCUMENTS

| 5,018,683 | A | | 5/1991 | Hahn |
| 5,259,576 | A | * | 11/1993 | Howard ................ B64C 1/1438 244/129.4 |
| 5,340,054 | A | | 8/1994 | Smith |

(Continued)

FOREIGN PATENT DOCUMENTS

| EP | 1142784 A1 | 10/2001 |
| FR | 3053023 A1 | 12/2017 |

OTHER PUBLICATIONS

French Search Report for Application No. 230614 dated Sep. 29, 2023.

*Primary Examiner* — Joshua J Michener
*Assistant Examiner* — Cindi M Curry
(74) *Attorney, Agent, or Firm* — KDW Firm PLLC

(57) ABSTRACT

An aircraft part with a door for accessing inside an aircraft and a fuselage part includes a cavity between an upstream edge of the door in the closed position and a downstream edge of the fuselage part, the cavity opening to the outside of the aircraft part and having a bottom connected to the upstream edge of the door and to the downstream edge of the fuselage part. The aircraft part includes a chamfer on the outer face of an outer plate of the door at the upstream edge of the door, as well as possibly other technical features such as a sharp ridge and/or an add-on component, allowing for reducing noise generated by the cavity.

9 Claims, 3 Drawing Sheets

(56) References Cited

U.S. PATENT DOCUMENTS

| | | | | |
|---|---|---|---|---|
| 5,868,355 | A * | 2/1999 | Carter, Jr. | B63B 19/08 |
| | | | | 244/129.5 |
| 10,882,598 | B2 * | 1/2021 | Chavez | B64C 1/143 |
| 2011/0042517 | A1 * | 2/2011 | Depeige | B64C 1/143 |
| | | | | 244/129.5 |
| 2012/0267475 | A1 | 10/2012 | Campos | |
| 2017/0369146 | A1 * | 12/2017 | Perez | B64C 1/1461 |
| 2018/0170512 | A1 * | 6/2018 | Fischer | B64C 1/1407 |

\* cited by examiner

AIRCRAFT PART THAT COMPRISES AN ACCESS DOOR AND A FUSELAGE PART FORMING A CAVITY AND IS CONFIGURED TO REDUCE NOISE GENERATED BY THE CAVITY

TECHNICAL FIELD

The disclosure herein relates to an aircraft part comprising an access door and a fuselage part forming a cavity, the aircraft part being configured to reduce noise generated by the cavity.

BACKGROUND

It is known that, at an access door that provides access to the inside of an aircraft, in particular of a transport plane, a small cavity is generally created when the door is closed. This blind cavity, which opens to the outside of the aircraft, is formed between the peripheral edge of the door and the fuselage part forming the frame of the door, around the peripheral edge of the door.

During a flight of the aircraft, the part of such a cavity that is situated at the upstream edge of the door, with respect to the direction of airflow along the fuselage, may generate noise. This noise is caused by the aerodynamic flow above the cavity (which is closed toward the inside). More particularly, the noise results from the coupling between the boundary layer of the aerodynamic flow and a recirculation corresponding to a portion of aerodynamic flow that enters the cavity and is returned to the outside, circulating from downstream to upstream.

The noise generated in this way is akin to a whistle, which may be disturbing for the passengers and the crew on the aircraft. It is known that, generally, noise of this kind is mainly generated by the cavity formed at the upstream edge of the access doors located at the front.

There is therefore a need to find a solution that makes it possible to reduce this kind of noise.

SUMMARY

One aim of the disclosure herein is to provide such a solution. To this end, the disclosure herein relates to an aircraft part comprising an access door and a fuselage part comprising at least one door frame located upstream of the door, the aircraft part being provided with a cavity formed between, on one side, an upstream edge of the door in the closed position and, on the other side, a downstream edge of the fuselage part, which is located facing the upstream edge of the door, upstream and downstream being defined with respect to the direction of airflow outside the aircraft part, the cavity opening to the outside of the aircraft part and comprising a bottom connected to the upstream edge of the door and to the downstream edge of the fuselage part, the door being equipped toward the outside with a plate provided with an outer face.

According to the disclosure herein, the outer face of the plate of the door comprises, at the upstream edge of the door, a chamfer.

Advantageously, the chamfer comprises an oblique face, which forms an angle between 15° and 50° with respect to a general direction of the outer face of the plate, preferentially between 20° and 30°.

This chamfer enables at least a significant portion of the aerodynamic flow circulating along the outer face of the fuselage of the aircraft to be directed outside of the cavity, during a flight, and thus enables the noise-generating recirculation of air to be prevented. In addition, forming the chamfer reduces the thickness of the upstream edge of the plate that is liable to be subject to a portion of the aerodynamic flow, which reduces or eliminates the presence of a wall or obstacle (equal to the thickness of the plate) with which the contact by the aerodynamic flow would have created an impact, which would contribute to the generation of noise.

Thus, by virtue of the abovementioned features and the technical effects generated, the chamfer makes it possible to reduce the noise, at least for the main noise frequencies, which are disturbing for the passengers and the crew on the aircraft. This makes it possible, in particular, to improve the comfort of the passengers and the crew on the aircraft.

In the context of the disclosure herein, the aircraft part may comprise any kind of access door that exists on an aircraft and has a cavity. An access door is considered to be a door that provides access from the outside of the aircraft to an inner part of the aircraft. It may of course refer to a door that allows people to access the inside of the cabin of the aircraft. It may also refer to other doors that provide access from the outside to a part of the aircraft, such as a cargo door or a door for accessing one or more items of equipment, such as, for example, a door for accessing a radar of the aircraft.

Moreover, this chamfer may be formed in a simple and low-cost manner.

In one preferred embodiment, a ridge, which is formed at the join between, on one side, the downstream edge of the fuselage part and, on the other side, an outer face of the fuselage part, is a sharp ridge.

In a first embodiment, the sharp ridge corresponds, in terms of cross section, to a joining point of two straight-line segments, and, in a second embodiment, the sharp ridge corresponds, in terms of cross section, to an arc of a circle with a radius smaller than 1 millimeter, preferably of around 0.5 millimeters.

This sharp ridge makes it possible to reduce the angle of an (aerodynamic) flow cone, which is generated at the ridge by the aerodynamic flow, compared to that generated by a ridge having an arc of a circle with a large radius.

This sharp ridge makes it possible to stabilize the flow-separation point on the fuselage-part edge and thus to limit the fluctuations of the boundary layer, which results in a reduction in the noise.

This sharp ridge is particularly advantageous in combination with the chamfer. This is because reducing the angle of the flow cone makes it possible to direct most or at least a significant portion of the aerodynamic flow located in the flow cone onto the oblique outer face of the chamfer. This aerodynamic flow is thus returned to the outside of the cavity by the oblique outer face of the chamfer, which makes it possible to reduce the noise (generated by recirculation in the cavity) even further.

In one particular embodiment, the aircraft part also comprises an add-on component arranged inside the cavity, in contact with both the downstream edge of the fuselage part and the bottom of the cavity.

Advantageously, the add-on component has a triangular form. In addition, advantageously, the add-on component is adhesively bonded inside the cavity.

The disclosure herein also relates to an aircraft, in particular a transport plane, which comprises at least one aircraft part, such as the one described above. In one particular embodiment, the aircraft may comprise a plurality of aircraft parts of this kind that are configured to reduce the noise, and namely one aircraft part at each access door that generates a disturbing noise of the abovementioned kind.

BRIEF DESCRIPTION OF THE DRAWINGS

The appended figures will make it easy to understand how the disclosure herein may be implemented. In these figures, identical reference signs denote similar elements.

DETAILED DESCRIPTION

Figure 1:
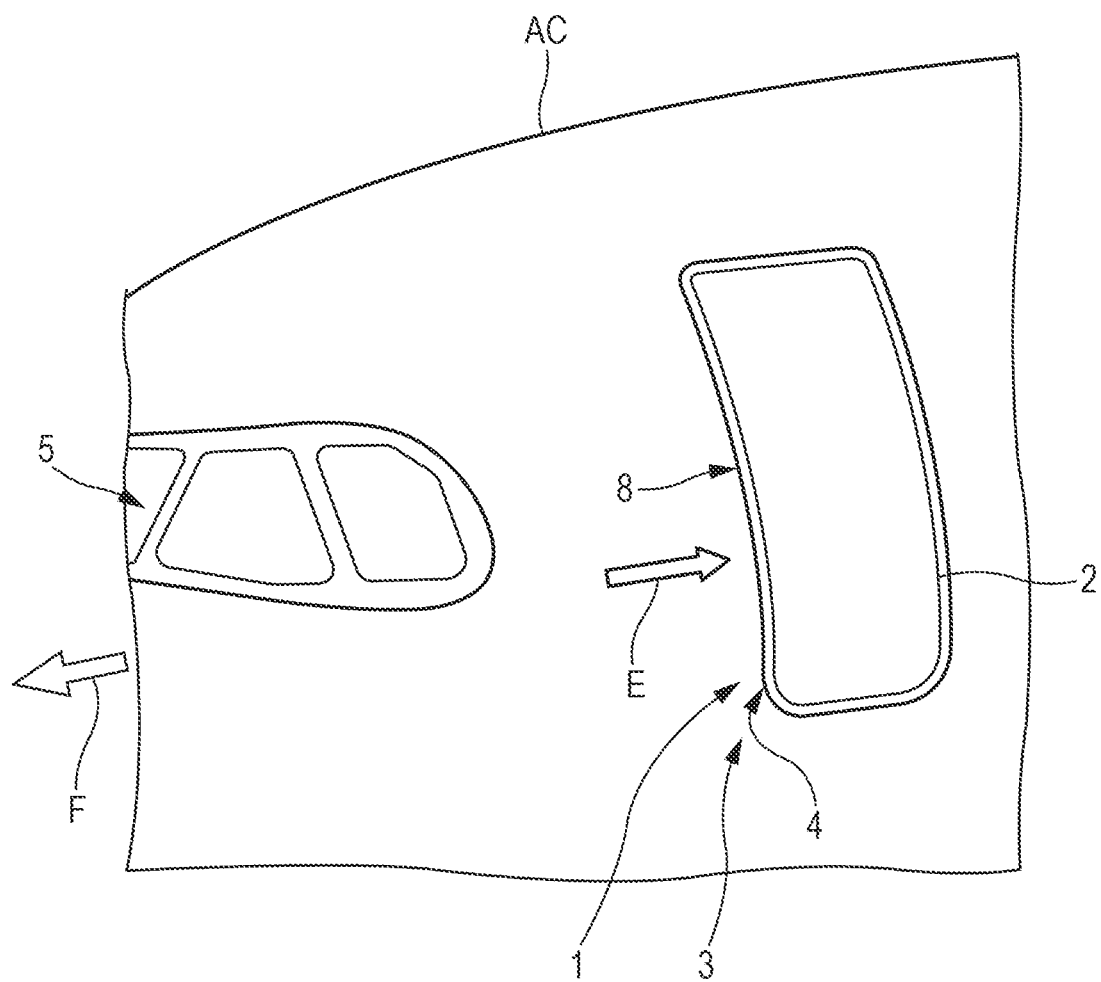
FIG. 1 is a partial, perspective view of the front of an aircraft showing an aircraft part to which the disclosure herein may be applied.

The aircraft part 1, which is shown schematically in FIG. 1 and makes it possible to illustrate the disclosure herein, is an outer part of an aircraft AC, in particular of a transport plane. This aircraft part 1 comprises, in particular, a conventional access door 2, i.e. a door that provides access to the inside of the aircraft AC, and a fuselage part 3 comprising at least one door frame 4 (located at least upstream of the door 2).

In the context of the disclosure herein, the access door may correspond to any kind of access door that provides access from the outside of the aircraft to an inner part (cabin, hold, etc.) of the aircraft and that has a cavity as specified below.

In the example in FIG. 1, which partially shows the front of the aircraft AC, for example a single-aisle transport plane, and in particular shows a part of the cockpit 5, the aircraft part 1 is located at a front-left door 2. The disclosure herein of course applies to any kind of transport plane.

Figure 2:
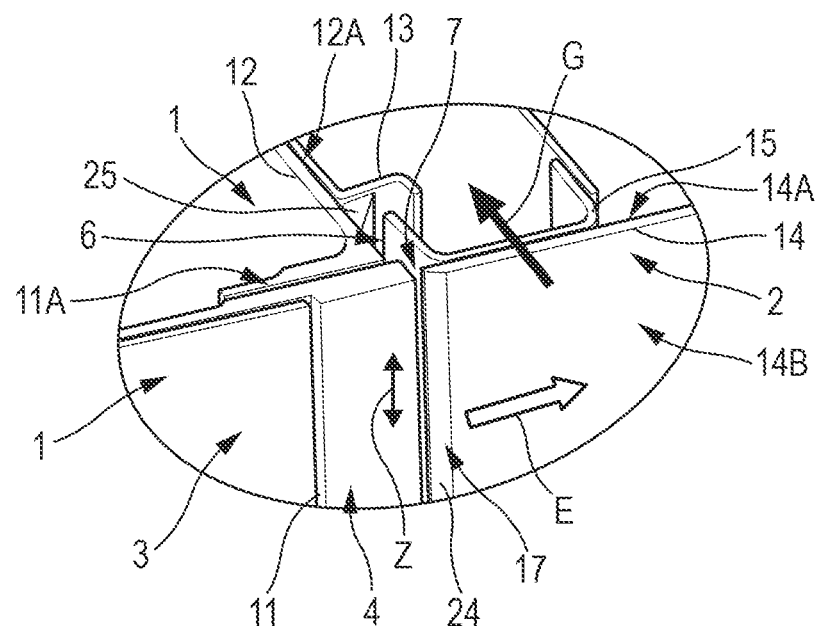
FIG. 2 is a partial, perspective view of a cavity formed between a fuselage part and an upstream edge of an access door of the aircraft.
Figure 3:
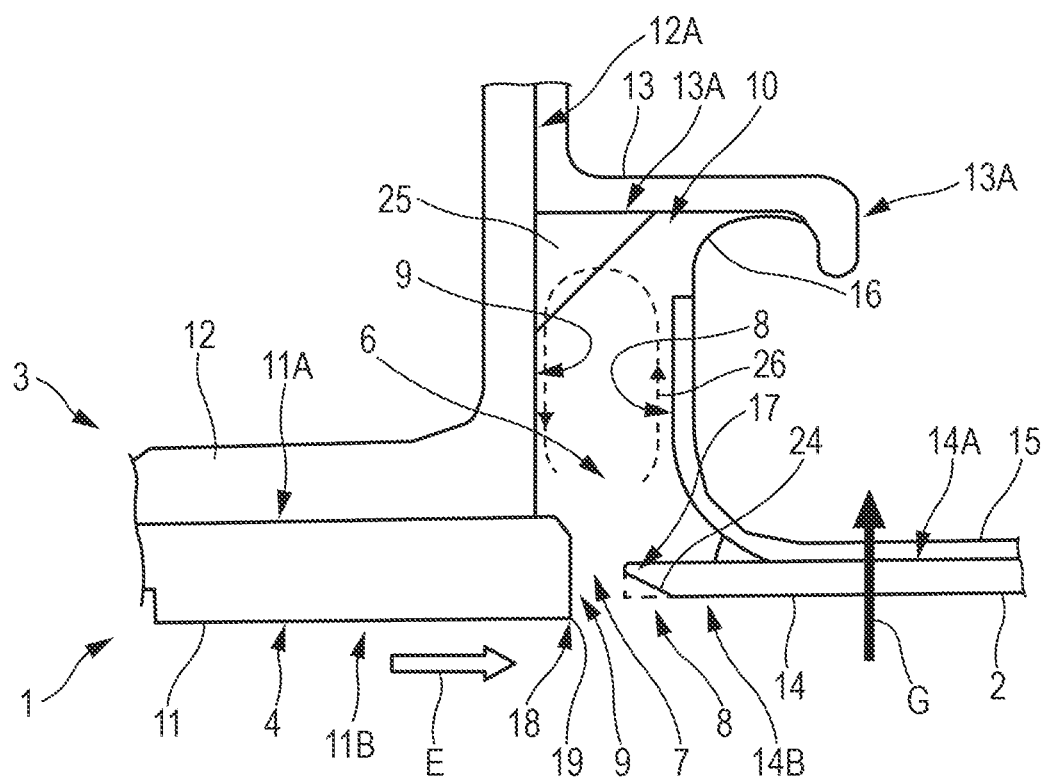
FIG. 3 is a cross-sectional view showing the cavity from FIG. 2 provided with noise-reducing elements.

In the context of the disclosure herein:
the terms "upstream" and "downstream" are defined with respect to the direction of airflow outside the aircraft part 1, as illustrated by an arrow E in FIG. 1, when the aircraft AC is flying in the direction illustrated by an arrow F in FIG. 1; and
the terms "outside" and "outer", on the one hand, and "inside" and "inner", on the other hand, are respectively defined with respect to the outside and to the inside of the aircraft AC or of the aircraft part 1, as illustrated by an arrow G in FIGS. 2 and 3, which is directed toward the inside. The inside (or inner) is therefore located in the direction of the arrow G, and the outside (or outer) is located in the opposite direction to that of the arrow G.

The aircraft part 1 is provided with an elongate (vertically in the direction shown by a double-headed arrow Z in FIG. 2) cavity 6, which is formed when the door 2 is closed.

This cavity 6 opens to the outside of the aircraft AC, via an opening 7 (or mouth), as shown in FIGS. 2 and 3. The cavity 6 is blind, i.e. it does not provide access from the outside of the aircraft AC to the inside of the aircraft AC. The cavity 6 is closed by, as the sole opening, the opening 7.

Although cavities of this kind are formed all around the door 2 when it is closed, between the peripheral edge of the door 2 (i.e. the edge that surrounds the door 2) and the fuselage part 3 forming the frame 4 of the door, the cavity 6 considered in the description below is located on the upstream edge 8 of the door 2. The upstream edge 8 of the door 2 corresponds to the vertical edge upstream of the door 2 (FIG. 1).

More precisely, the cavity 6 (FIG. 3) is formed between:
on one side, the upstream edge 8 of the door 2 in the closed position; and
on the other side, a downstream edge 9 of the fuselage part 3, this downstream edge 9 being located facing the upstream edge 8 of the door 2.

The (blind) cavity 6 also comprises a bottom 10 connected to the upstream edge 8 of the door 2 and to the downstream edge 9 of the fuselage part 3.

The bottom 10 is in the form of a portion connecting the upstream edge 8 of the door 2 to the downstream edge 9 of the part of the fuselage 3. It may be in the form of a planar element, as described in FIG. 3. It may equally be in the form of a curved element, or even a joining point between the upstream edge 8 and the downstream edge 9.

In the particular embodiment in FIGS. 2 and 3, the downstream edge 9 of the fuselage part 3 comprises a set of conventional components, in particular metal components, which are fixed together, and in particular:
an outer plate 11 located toward the outside of the aircraft AC and corresponding, for example, to the frame 4 of the door 2;
a plate 12, which is in the form of a bracket and is fixed on the inner face 11A of the outer plate 11; and
a component 13 (in the form of a bracket with a free end 13A provided with an elbow) fixed on a downstream face 12A of the plate 12.

The outer plate 11 corresponds to the skin of the fuselage. This plate 11 and the plate 12 may be in the form of a single-piece element or of two parts connected together by any structure(s) known to those skilled in the art, as described in the remainder of the description.

In addition, the door 2 comprises in particular:
an outer plate 14 located toward the outside of the aircraft AC; and
a plate 15, which is generally U-shaped (FIG. 2) and is fixed on the inner face 14A of the outer plate 14.

The outer plate 14 relates to the outer face of the door 2, commonly referred to as skin. This plate could also be in the form of an add-on element.

The aircraft part 1 also comprises, as shown in FIG. 3, a seal 16, which is fixed to the inner end of the plate 15 of the door 2 and is in contact with the plate 13 of the fuselage part 3, in the closed position of the door 2. For reasons of clarity of the drawing, the seal (although present) is not shown in FIG. 2.

During a flight of the aircraft AC, this cavity 6 (formed by the elements 11 to 16), which is situated upstream of the door 2, with respect to the direction E of airflow along the fuselage during the flight, may generate noise.

Figure 4:
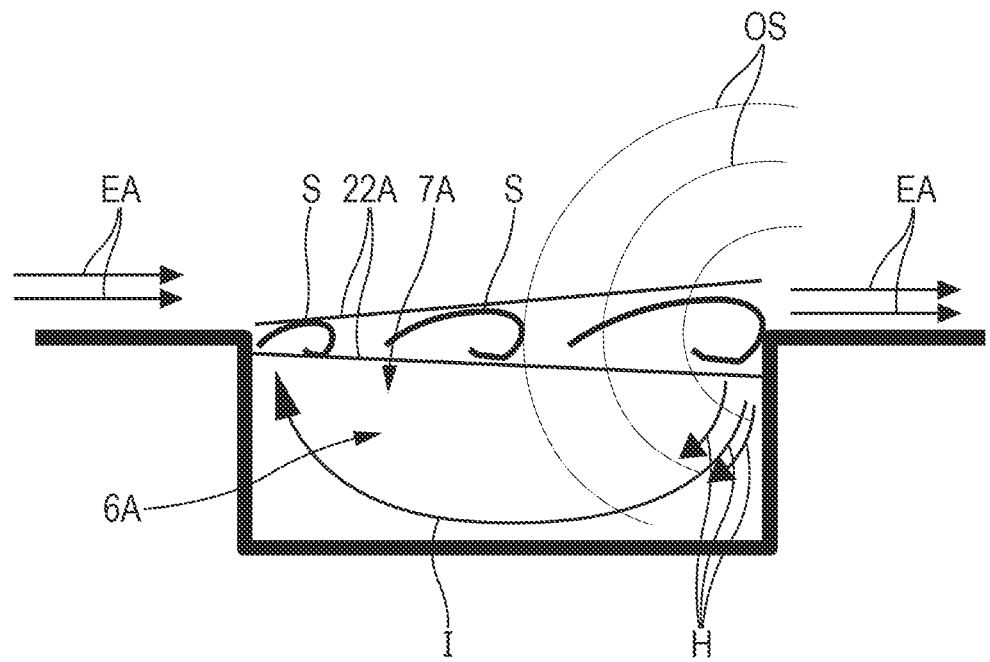
FIG. 4 is a schematic view of a cavity that makes it possible to explain noise generation.

FIG. 4 schematically illustrates a (blind) cavity 6A, which opens, via an opening 7A, toward the outside and at which an aerodynamic flow EA is generated. FIG. 4 is a schematic figure intended to explain the main phenomena occurring in a cavity 6A that is located outside the fuselage of an aircraft during a flight and contributes to the generation of noise. Although this cavity 6A is different than the cavity 6 in FIGS. 2 and 3 and is represented schematically, the reference signs relating to the cavity 6 have been repeated in FIG. 4 with the letter A added thereto (to make the connection with the cavity 6). The aerodynamic stream or flow EA generates, at the upstream edge of the cavity 6A, a flow cone 22A, a portion of which comes into contact with the downstream edge of the cavity 6A and is directed into the cavity 6A, as illustrated by arrows H. This generates a recirculation of flow as illustrated by an arrow I, which re-emerges at the upstream edge and acts on the flow EA in such a manner as to create turbulence (illustrated by symbols S) in the flow cone 22A, which generates noise, shown schematically by sound waves OS in this FIG. 4.

Consequently, on the basis of the preceding explanation, during a flight of the aircraft AC, the aerodynamic flow E (FIGS. 1 to 3) above the (closed) cavity 6 generates noise. This noise, which is in particular caused by the coupling between the aerodynamic flow E and the return current (after recirculation) in the cavity 6, is akin to a whistle that can be heard inside the aircraft AC and may be disturbing for the passengers and the crew on the aircraft AC.

Generally, the noise generated comprises, in particular, whistles of particularly disturbing sound frequencies, which are located in two frequency ranges, namely a first frequency range between 5 kHz and 6.5 kHz, and a second frequency range between 8.5 kHz and 10 KHz.

In order to reduce this noise, the outer face 14B of the outer plate 14 of the door 2 comprises, at the upstream edge 8 of the door 2, a chamfer 17, i.e. its upstream end 23 (FIG. 5) has a bevel cut on the outer face 14B.

Figure 5:
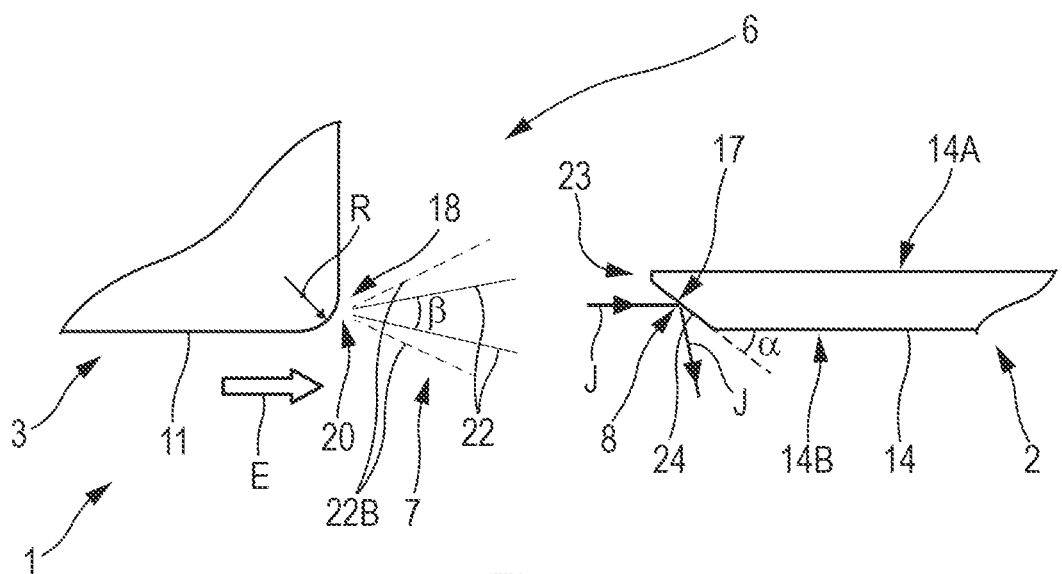
FIG. 5 is an enlarged view, which shows a portion of the sectional view from FIG. 3, which in particular makes it possible to explain the combined action of a chamfer and a sharp ridge in reducing the noise.

In one particular embodiment, which is shown in FIG. 5, the chamfer 17 comprises an oblique outer face 24, which forms an angle α with respect to the general direction of the outer face 14B of the outer plate 14. This angle α is between 15° and 50°, and preferably between 20° and 30°.

This chamfer 17 enables at least a significant portion of the aerodynamic flow E circulating along the outer face of the fuselage of the aircraft to be directed outside of the cavity 6, during a flight, and thus enables a noise-generating recirculation of air to be prevented.

In addition, creating the chamfer 17 reduces (or eliminates) the thickness of the upstream end 23 of the outer plate 14 (which is liable to be subject to a portion of the aerodynamic flow), which eliminates the presence of a wall or an obstacle (equal in size to the thickness of the plate 14 at the upstream end 23) with which the contact by the aerodynamic flow would have created an impact, which would contribute to the generation of noise.

By virtue of these technical features and the technical effects generated thereby, the chamfer 17 makes it possible to reduce the noise connected to the cavity 6, and at the very least the main noise (in particular whistling) frequencies, which are disturbing for the passengers and the crew on the aircraft.

Moreover, this chamfer 17, which is formed, for example, by a bevel cut in the outer plate 14 at the upstream end 23, may be formed in a simple and low-cost manner.

In addition, in one preferred embodiment, a downstream ridge 18 formed on the outer plate 11 has a particular form, namely a sharp form that is specified below, which allows it to contribute to reducing the noise.

As shown in FIG. 3, the ridge 18 is located at the join between, on one side, the downstream edge 9 of the outer plate 11 of the fuselage part 3 and, on the other side, the outer face 11B of the outer plate 11 of the fuselage part 3. This ridge 18 is sharp, as shown in FIGS. 3 and 5.

In a first embodiment, which is shown in FIG. 3, the sharp ridge 18 has, in terms of cross section, a joining point 19 of two straight-line segments (corresponding to the downstream edge 9 and to the outer face 11B of the outer plate 11, respectively). In this first embodiment, the sharp ridge 18 terminates in a point.

Moreover, in a second embodiment shown in FIG. 5, the ridge 18 has, in terms of cross section, an arc of a circle 20 with a small radius R, which is smaller than 1 millimeter, preferably of around 0.5 millimeters. Such an arc of a circle 20 makes it possible to control the detachment point and thus in particular to direct the flow onto the oblique outer face 24 of the chamfer 17.

This sharp ridge 18 (in accordance with the first embodiment or with the second embodiment) makes it possible to reduce the angle ß of an (aerodynamic) flow cone 22, which is generated at the ridge 18 by the aerodynamic flow E, as shown in FIG. 5, compared to the cone 22B (illustrated by dashed lines) that would have been generated by a ridge having an arc of a circle with a large (greater than the radius R) radius. This sharp ridge 18 makes it possible to stabilize the flow-separation point on the edge of the plate 11 (of the fuselage part 3) and thus to limit the fluctuations of the boundary layer, which results in a reduction in noise.

This sharp ridge 18 is particularly advantageous in combination with the chamfer 17, as in the embodiments in FIGS. 3 and 5. This is because reducing the angle ß of the flow cone 22 makes it possible to direct most (or at least a significant portion) of the aerodynamic flow located in the flow cone 22 onto the oblique outer face 24 of the chamfer 17. This aerodynamic flow is thus returned to the outside of the cavity 6 by the oblique outer face 24 of the chamfer 17, as illustrated by arrows J in FIG. 5, which makes it possible to reduce the noise (generated by recirculation in the cavity) even further.

Moreover, the sharp ridge 18 may be formed in a simple and low-cost manner.

In one particular embodiment, which is shown in FIGS. 2 and 3, the aircraft part 1 also comprises an add-on component 25 arranged inside the cavity 6. This add-on component 25 is in contact, on one side, with the downstream edge 12A of the plate 12 of the fuselage part 3 and, on the other side, with the outer face 13A of the plate 13 of the fuselage part 3, i.e. with the bottom 10 of the cavity 6. Preferably, the add-on component 25 has a general form that is substantially triangular.

In one particular embodiment, the add-on component 25, which is made of polymer, for example, is adhesively bonded inside the cavity 6, both on the downstream edge 12A of the plate 12 and on the bottom 10 of the cavity 6. This add-on component 25 must be rigid so that its structure is comparable to that of the upstream 8 and downstream 9 edges.

This add-on component 25 makes it possible to modify the main circulation path of the flow in the cavity 6. Thus, by virtue of the presence of this add-on component 25, the usual circulation path (illustrated schematically by a dashed line 26 in FIG. 3) cannot be taken by the flow. The add-on component 25 consequently reduces the retroaction of this circulation on the aerodynamic flow at the mouth (opening 7) of the cavity 6. This has the effect of reducing the sound level.

The abovementioned particular elements and features (chamfer 17, sharp ridge 18, add-on component 25) of the aircraft part 1, whether they are considered individually or in combination, make it possible to greatly reduce the noise (in particular an audible, unpleasant whistle) that is liable to be generated by the cavity 6. In particular, they make it possible to reduce the particularly disturbing sound frequencies, which are created in the two abovementioned frequency ranges, namely between 5 kHz and 6.5 kHz, and between 8.5 kHz and 10 KHz. This makes it possible, in particular, to improve the flight comfort for the passengers and the crew on the aircraft.

The aircraft part 1 provided with these noise-reducing elements, which has been described above in connection with a front door 2 of an aircraft, at which the disturbing noises are generally loudest, may be applied to any access door of the aircraft at which such a noise is generated. Thus, in one particular embodiment, the aircraft may comprise a plurality of aircraft parts 1 of this kind, which are configured to reduce the noise, and more specifically one aircraft part 1 at each access door in which a cavity generates such a noise, which is disturbing for the passengers and/or the crew on the aircraft.

While at least one example embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft part comprising:
   an access door and
   a fuselage part comprising at least one door frame located upstream of the door,
   wherein a cavity is formed between, on one side, an upstream edge of the door in a closed position and, on another side, a downstream edge of the fuselage part, which is located facing the upstream edge of the door, upstream and downstream being defined with respect to a direction of airflow outside the aircraft part,
   wherein the upstream edge of the door in the closed position is spaced apart from the downstream edge of the fuselage part such that the cavity opens to the outside of the aircraft part via an opening,
   wherein the cavity comprises a bottom connected to the upstream edge of the door and to the downstream edge of the fuselage part,
   wherein the door is equipped toward the outside with a plate comprising an outer face, and
   wherein the outer face of the plate of the door comprises, at the upstream edge of the door that bounds the opening, a chamfer positioned to direct a portion of the airflow outside the aircraft part away from the cavity.

2. The aircraft part of claim 1, wherein the chamfer comprises an oblique face, which forms an angle between 15° and 50° with respect to a general direction of the outer face of the plate.

3. The aircraft part of claim 1, wherein a ridge, which is formed at a join between, on one side, the downstream edge of the fuselage part and, on another side, an outer face of the fuselage part, is a sharp ridge.

4. The aircraft part of claim 3, wherein the sharp ridge corresponds, in terms of cross section, to a joining point of two straight-line segments.

5. The aircraft part of claim 3, wherein the sharp ridge corresponds, in terms of cross section, to an arc of a circle with a radius smaller than 1 millimeter.

6. The aircraft part of claim 1, comprising an add-on component inside the cavity, in contact with both the downstream edge of the fuselage part and the bottom of the cavity.

7. The aircraft part of claim 6, wherein the add-on component has a triangular form.

8. The aircraft part of claim 6, wherein the add-on component is adhesively bonded inside the cavity.

9. An aircraft comprising at least one aircraft part of claim 1.

* * * * *